June 15, 1965  H. T. SCHIRM  3,189,427
BAFFLE MECHANISM FOR GLASS MOLD ASSEMBLY
Filed May 31, 1961  3 Sheets-Sheet 3
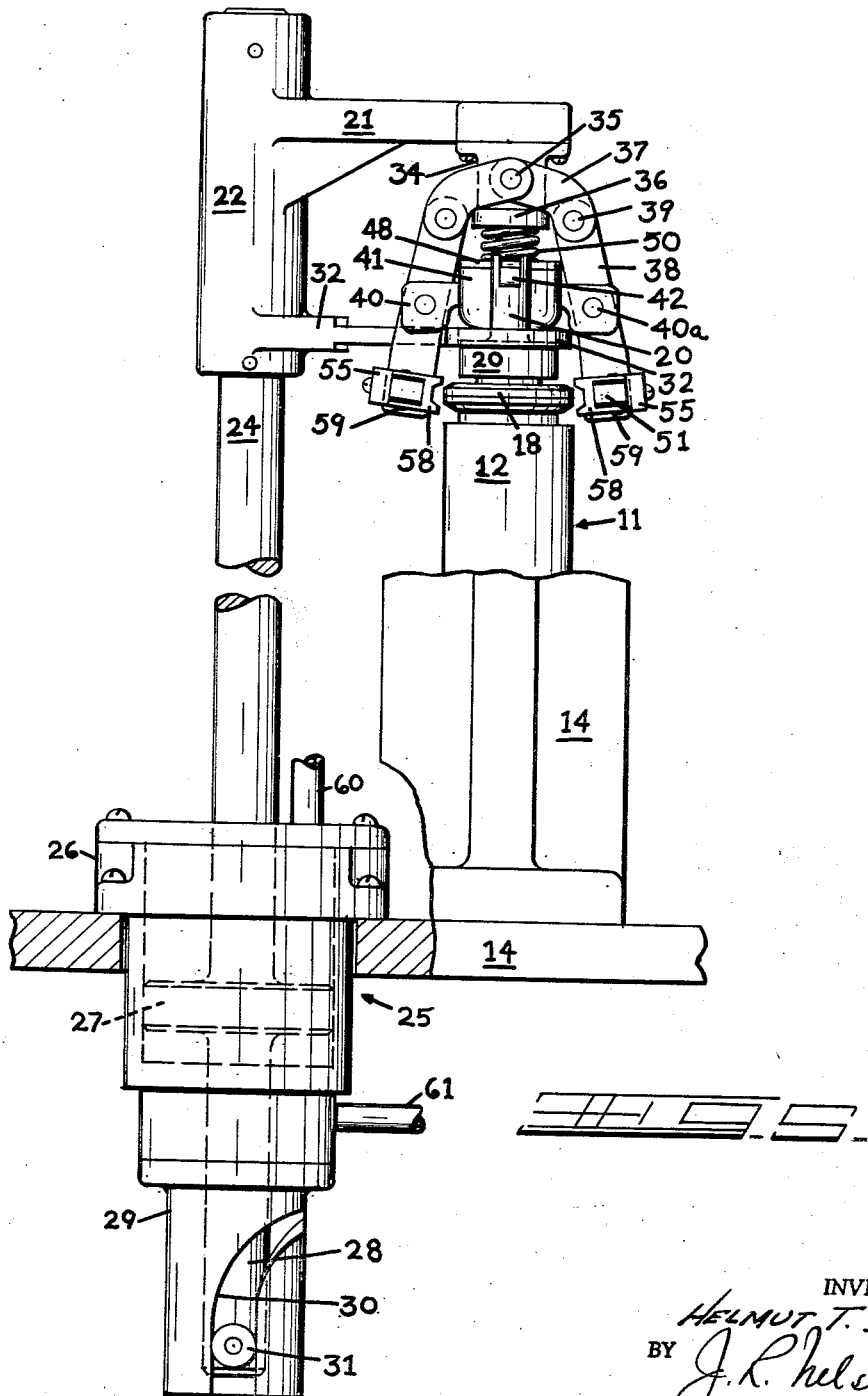
INVENTOR.
HELMUT T. SCHIRM
BY
ATTORNEYS

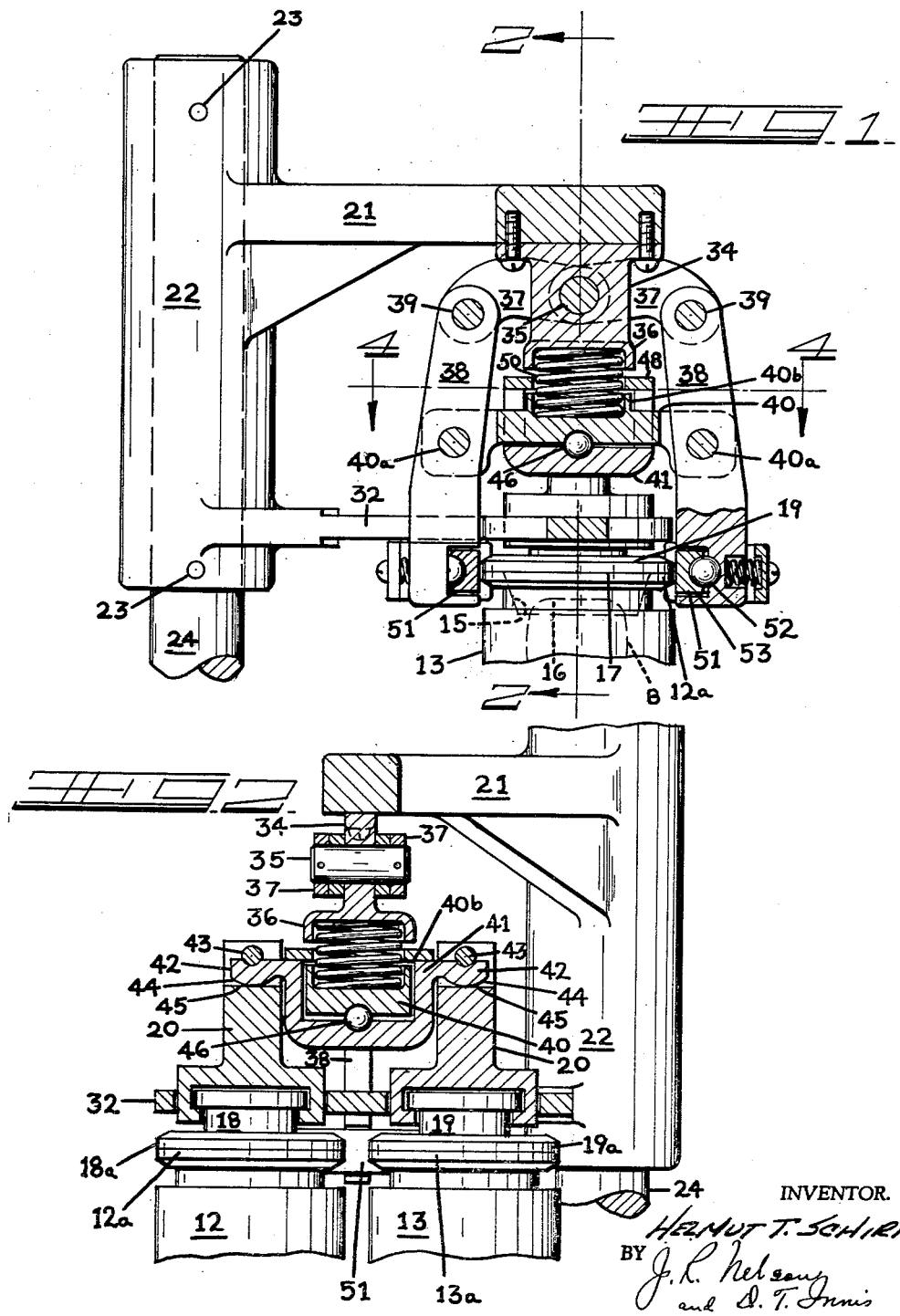

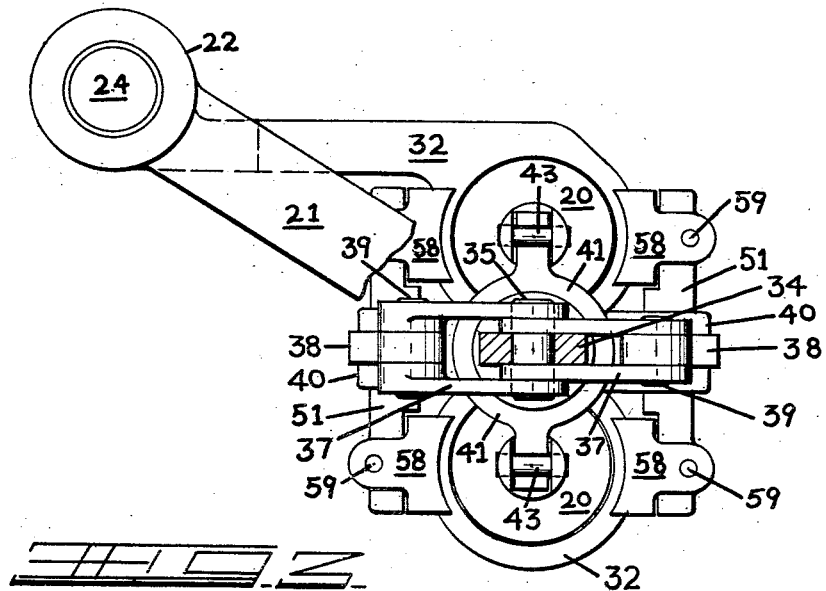
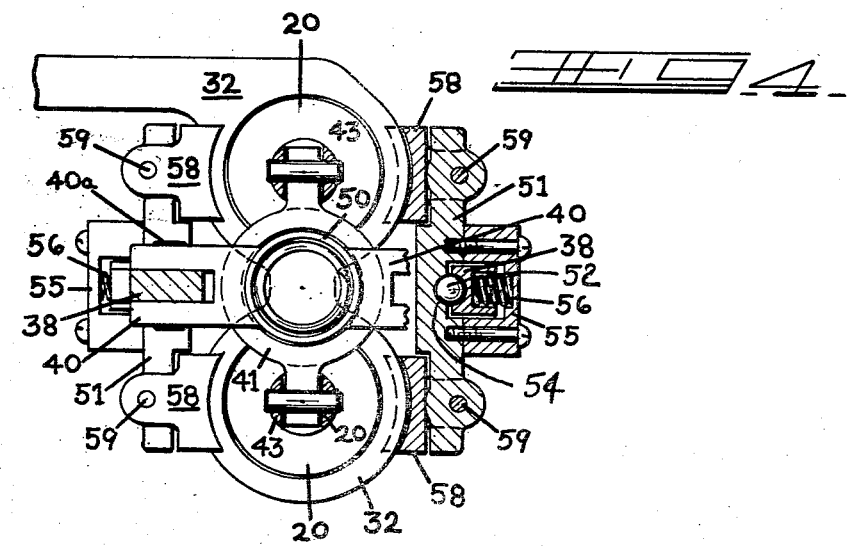

United States Patent Office 3,189,427
Patented June 15, 1965

3,189,427
BAFFLE MECHANISM FOR GLASS MOLD ASSEMBLY
Helmut T. Schirm, Toledo, Ohio, assignor to Owens-Illinois Glass Company, a corporation of Ohio
Filed May 31, 1961, Ser. No. 113,935
2 Claims. (Cl. 65—323)

The present invention relates to improvements on a multiple cavity blank mold assembly of a glass forming machine wherein molten charges or gobs of glass are loaded and formed to the shape of parisons. More particularly, the invention relates to a self-aligning and self-clamping baffle mechanism for closing the cavities of the mold assembly after the gobs of glass are loaded and before forming thereof is undertaken.

In glass forming machines presently employed, it is common practice to employ a double cavity blank mold which is disposed with the axes of the cavities vertical and open at the opposite axial ends. A set of corresponding neck rings or molds are manipulated to be adjacent the lowermost end opening of each of the mold cavities, and charges of molten glass in the form of gobs are loaded in pairs through the open upper ends of the blank mold cavities. After the gobs are loaded, the open upper end of each cavity is closed by a baffle. Thus, with the molds charged with hot plastic glass and the baffles seated to close the upper end openings of the molds, the parts of the mold assembly are arranged in glass molding position. A plunger is registered with each of the neck rings and the lower end opening of the blank mold cavities and operated in a reciprocating fashion axially of the neck rings into and out of each of the blank mold cavities through their lower end openings so that the glass gobs are formed to the shape of parisons in the mold.

In mechanisms of this type, it is most important that the baffles be conveniently, rapidly, and efficiently aligned with the corresponding mold openings to provide a satisfactory seat in the mold cavity opening and thereby effectively reduce baffle marking on the formed parisons.

It is an object of the invention, therefore, to provide such a baffle mechanism for simultaneously closing plural cavities of a mold unit with baffles that will be self-aligned respectively with their mold cavity openings and thereby unerringly close each mold cavity for the parison forming operation.

In high speed forming machines wherein the parisons are formed by mechanical pressing forces supplied through the displacement of a pressing plunger into each mold cavity, the pressing forces transmitted to the mold are great and are sharply administered so as to create a tendency for the baffles and blank mold unit to separate thereby unseating the baffle. Any such unseating movement will materially affect the quality of the parison by the resultant baffle marks produced.

Another object of the invention is, therefore, the provision of a self-clamping device carried on the baffle mechanism that will unerringly and consistently clamp each of the plural baffles onto the respective blank molds in molding position automatically in sequence with the normal molding cycle of the machine. To this end, the improved baffle clamping device of the invention is provided with limited universal adjusting movement to enable proper alignment of the clamps with the seated baffles and their corresponding molds in clamping them together.

A further object of the invention is to provide a self-aligning and self-clamping baffle mechanism of the type just-mentioned that is of simple, lightweight construction having a minimum of parts for maintenance, and yet is readily adaptable to use with existing forming machines and is self-operated by the baffle carriage device by its travel for moving the baffle mechanism into and away from the molding position whereat the baffles are seated for closing the mold cavities to enable proper molding of the glass therein.

The specific nature of this invention, as well as other objects and advantages thereof, will become apparent to those skilled in the art from the following detailed description, taken in conjunction with the annexed sheets of drawings, on which, by way of preferred example only, is illustrated an embodiment of this invention.

In the drawings:

FIG. 1 is a front elevational view, partly in section, showing partially a double-gob blank mold assembly that is equipped with the present invention wherein baffles are clamped to the mold in glass molding position, thus closing the upper end openings of the mold cavities and the molds clamped tightly closed;

FIG. 2 is a side sectional elevational view of the apparatus of FIG. 1 taken along line 2—2 of FIG. 1;

FIG. 3 is a plan view of the apparatus of FIG. 1 and is partly broken away and partly sectioned;

FIG. 4 is a sectional plan view taken along line 4—4 of FIG. 1; and

FIG. 5 is a front elevational view of the blank mold assembly of a glass forming machine showing the baffle mechanism of the invention and the baffle carriage device.

Referring to the drawings, a double-gob blank mold 11 is shown as comprising a front mold 12 and a back mold 13 suitably mounted on the machine frame 14 and manipulated by means (not shown) for moving them into and out of the glass molding position for co-operation with the other forming elements of the blank molding unit. The blank mold may be of either a one-piece construction, as is illustrated on the figures for sake of simplicity, or may be constructed as a split or partible mold which will open and close about a parting line on the line 2—2 of FIG. 1. In either type of mold, interior cavities B are provided with their axes disposed parallel and vertical. Each cavity B is open at its top end. This top opening includes an annular baffle seat match 15. Externally of the seat match 15 of molds 12 and 13 are complementary annular bosses 12a and 13a having a downwardly and inwardly tapered surface and a flat upper baffle seat surface 17.

Baffles 18 and 19 are shown on FIG. 2 as repectively closing the upper end openings of the molds 12 and 13. Each of the baffles 18 and 19 include annular bosses 18a and 19a that are coexistive with the bosses 12a and 13a on the mold. The two sets of matching bosses 12a, 18a and 13a, 19a co-operate in the molding position as annular clamping surfaces. Each of the baffles 18 and 19 also includes an interior contoured molding surface at 16, as shown on FIG. 1, that is adapted to align with mold cavity B and form one end of the parison article.

Each of the baffles 18 and 19 have a male joint of a bayonet-type connector for attaching the baffle in a quick-change socket member 20. A matching female joint is provided on the lower end of socket member 20 and the matching joints permit an interchange of the different baffles upon change of mold for a change in production on the machine.

A baffle carriage device comprising a laterally disposed baffle arm 21 and integral boss 22 is pin connected at 23 in a rigid fashion on the upper end of the vertical piston rod 24 of a fluid-operated reciprocating motor, indicated generally at 25 (FIG. 5). The cylinder of motor 25 is secured to the frame 14 of the machine by mounting bolts and bracket 26. Cylinder rod 24 for the baffle carriage is fastened to the piston 27 for movement thereby and a lower piston rod extension 28 extends on the opposite lower side of piston 27. Motor 25 is timed and operated by the machine control for driving piston 27 through its cycle of raising and lowering movement. A lower-end casting 29 is attached to the cylinder of motor 25 and is provided with a vertical journal guide for lower extension 28 of the piston rod. The lower end casting 29 has a curved cam groove 30 formed thereon to receive a cam roller 31 pivotally attached on piston rod extension 28. As motor 25 is operated to provide vertical raising and lowering movement for piston rod 24, a portion of the movement includes a rotation of rod 24 by cam 31 riding in the curved groove 30. Thusly, baffle arm 21 is swung to a remote out-of-the-way position at the upper end of the stroke of piston 27 and as the piston 27 travels towards its lower limit of movement, baffle arm 21 is swung back into aligning position for seating baffles 18 and 19 on their respective mold seats of molds 12 and 13.

Guide arm 32 is an integral part of carriage boss 22 and includes a pair of spaced annular guide rings that loosely surround socket members 20. The baffles are supported on the carriage arm through the toggle mechanism, which will now be described. A pivot bracket 34 is bolted to the underside of baffle arm 21 and houses pivot pin 35. The lower end of bracket 34 has an annular, upper spring guide 36. Complementary pairs of toggle links 37 are pivotally connected at their one end on pin 35 and have their opposite ends respectively pin connected to toggle arms 38 by pins 39. A lateral yoke member 40 formed with slots 38 and has end pin connections at 40a intermediate the toggle arms 38. Yoke member 40 is centrally, nestingly supported in a U-shaped baffle holder member 41 which has opposite support dogs 42 pivotally connected to the socket members 20 by pins 43. The underside of dogs 42 define a curved bearing surface 44 in contact with a lateral surface 45 on socket members 20. This means of connecting baffle sockets 20 to laterally extending dogs 42 of the baffle holder provides for rocking movement of baffles 18 and 19 about their supporting pin connections. Thus, baffles 18 and 19 are capable of rocking movement on the baffle holder but limited by guide rings of member 32 which enables the baffles to shift a limited amount in seating on the open ends of molds 12 and 13, respectively.

Yoke member 40 rests on a ball pivot 46 supported in a socket in the lower part of baffle holder 41. Lateral yoke 40 is held in spaced relationship with holder 41 to enable it to have a universal rocking movement of limited nature with respect to the baffle holder. Yoke 40 is retained in baffle holder 41 by cover ring 48. Coil spring 50 extends through cover ring 48 and is compressed between the upper guide 36 on bracket 34 and the top side of yoke member 40 in the cylindrical guide well 40b provided thereon.

A clamp holder 51 is mounted at the lower end of each toggle arm 38 for limited universal rocking movement. This mounting comprises a ball pivot 52 in arms 38 at a slot 53 provided with a ball seat for ball 52. Clamp holder 51 is retained in slot 53 and has a complementary central ball seat 54 to receive ball 52. As seen on FIG. 4, each clamp holder 51 has a U-shaped retaining member 55 which surrounds its toggle arm 38. A spring 56 is compressed between the outer side of the arm 38 and the inner back surface of the U-shaped member 55 forcing clamp holder 51 to seat on ball 52. Clearance is provided in the mounting just described to permit the clamp holder 51 a limited amount of universal movement about ball 52.

Baffle clamping shoes 58 are mounted at spaced points along each clamp holder 51 to provide a baffle clamp on opposite sides of each of the baffles 18 and 19. Each mounting of the clamping shoes 58 permits them a limited amount of horizontal rocking movement about their pivot pin 59 and a limited amount of vertical movement along pin 59. The shoes 58 may thus pivot on their clamp holders 51 and slide vertically with respect to the holders a limited amount as the shoes adjust to the juxtapositioned clamping bosses 12a, 18a or 13a, 19a in clamping the molds and baffles together.

In operation of the invention, the motor 25 is controlled by the timing mechanism of the forming machine to supply fluid pressure to either of the end ports 60 or 61 of motor 25 (FIG. 5) to thereby shift its piston 27 and piston rod 24 in reciprocating fashion. The cycle of the apparatus begins with the piston and piston rod in the raised position whereat the baffle mechanism is elevated and swung to one side of the blank mold in a remote position. Thusly, the end openings 15 of both mold cavities B are open. A pair of glass gobs (not shown) are delivered and loaded into the mold cavities B through the end openings 15. In succession thereafter, the piston of motor 25 is driven to lower carriage arm 21 and piston rod 24. During the lowering movement, cam 31 and slot 30 cooperate to simultaneously swing the baffle carriage for bringing the baffles 18 and 19 into molding position for closing the respective end openings of the molds 12 and 13. In this movement, the baffles 18 and 19, through their mounting at pins 43 and dogs 42, are permitted limited rocking movement for self-alignment with the baffle seats on the top of the two molds. The baffles, therefore, are brought to register on the molds and if the latter for one reason or another are not aligned or oriented as initially installed, the baffles will nevertheless be efficiently and effectively seated.

After the two baffles are seated, carriage arm 21 continues its downward travel vertically under control of motor 25.

At the instant the baffles engage their matching seats in the mold end openings, as earlier described, the toggle links 37 are being urged under the force of the spring 50 to retain the toggle arms 38 in their open or unclamping position so that the clamp shoes 58 are spaced away from the baffles. After the baffles have engaged the top end of the molds, the piston 27 of the motor continues in downward direction throughout a vertical over-travel from the position shown on FIG. 5. In this over-travel, the baffle carriage and its baffle arm 21 will move relative to the seated baffles. This actuates toggle links 37 and compresses spring 50 thereby closing toggle arms 38 by their pivoting movement on yoke member 40. The clamp holders 51 and clamp shoes 58 thereon are accordingly moved into clamping relationship with respect to annular bosses 12a, 18a and 13a, 19a. This is the position shown on FIGS. 1, 3 and 4, whereat baffles 18 and 19 are clamped tightly to the upper end of the respective molds 12 and 13 and the molds are clamped tightly shut in glass molding position ready for the application of the forming pressure in forming the parisons.

After pressing the parison is completed, the operation of motor 25 will be reversed. In so doing, baffle arm 21 will begin to raise; however, spring 50 will yield and retain baffle holder 41 and baffles 18 and 19 stationary on the molds until toggle arms 38 through toggle links 37 are pivoted away from the baffles thereby unclamping the parts by the disengagement of clamp shoes 58. Thus, spring 50 retains the baffles seated while the upward movement of the baffle carriage arm shortens the toggle link span 37 between the ends of toggle arms 38.

Continued upward movement of baffle arm 21 after clamp shoes 58 are disengaged from the baffles and molds will lift the entire assembly including the baffles, and swing the assembly to the raised remote position. During lifting, the baffles and clamp shoes are suspended from pivot 35 and toggle links 37 on the underside of carriage arm 21. The combination of the baffles, holder, carriage device, and clamping mechanism have their functions controlled and actuated by the reciprocating motion of the carriage rod or piston rod 24. Under the present invention, the sequence of operation and features of self-alignment are automatically provided for through the arrangement of linkage of the various parts.

In fulfilling the objects of the invention, it should be apparent from the foregoing detailed description of the illustrated embodiment, that the baffle mechanism employed is provided with three equalizing movements during actuation of the clamps for clamping the plural baffles carried thereby to the respective plural molds. This enables universal adjusting movement of the clamps in unerringly and efficiently clamping the baffles and molds together. Also, the mechanism provides universal adjusting movement of the baffles on their carriage for unerringly seating them in the openings of the molds automatically in the performance of every cycle.

While one embodiment of the present invention has been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. I a double-cavity blank mold defining a pair of side-by-side vertically disposed molding cavities each having an upper end opening, a pair of baffles adapted at times to close the said end openings, adjacent clamping surfaces respectively on each of said baffles and the blank mold, a horizontally disposed baffle carriage arm, toggle links pivotally connected to said baffle arm, toggle arms pivotally connected at their one end to said links, a holder assembly connected to said toggle arms and said baffles comprising a lateral yoke pivotally connected with said toggle arms, a baffle holder having laterally extending support dogs, means connected to each baffle including a pivot thereon engaging said baffle holder, a swivel connection between said baffle holder and said yoke permitting limited rocking movement between the yoke and said holder, a pair of lateral clamping bars, a swivel connecting means for said clamping bars at the other end of said toggle arms providing limited rocking movement of said clamping bar thereon, a plurality of clamping shoes, means for connecting a clamping shoe on each end of the lateral clamping bars providing limited vertical and horizontal movement thereon, whereby the clamping shoes are self-aligning on said adjacent clamping surfaces of the baffle and mold, spring means connected between the baffle carriage arm and said lateral yoke normally actuating the toggle links and toggle arms for baffle unclamping movement, means connected to said carriage arm for moving the baffles to and from said upper mold openings and actuating the toggle links and toggle arms for baffle clamping movement, thereby clamping and unclamping the baffles substantially simultaneously on said blank mold openings.

2. In a baffle device for closing a pair of side-by-side mold cavity end openings of a blank mold, the baffle and mold providing adjacent clamping surfaces when they are in molding position, the combination of a baffle carriage arm, a baffle holder having laterally extending dogs, a pair of spaced, side-by-side baffles rockably connected with said dogs of the holder, a pivot pin on said arm, toggle links pivotally connected on said pin, toggle arms pivotally connected to said links, an elongated yoke member pivotally connected to each of the toggle arms, a pivot ball supported centrally on the baffle holder, said yoke member being seated on said ball for limited rocking movement between it and the baffle holder, spring means connected between the baffle arm and said yoke normally pivoting said toggle arms for unclamping movement, motor operated means connected for moving the baffle carriage arm and for actuating the toggle arms for clamping movement, a pair of lateral clamp holder bars, a plurality of baffle clamping shoes, means mounting a clamping shoe at each end of said clamp holder bars for limited horizontal and vertical movement thereon, a ball pivot centrally of each said clamp holder bars, and a yieldable retaining member mounting each of the ball pivots and its said holder bar on the end of one of the toggle arms providing each said holder bar a limited universal rocking movement on its said toggle arm, said mountings for said bars on the toggle arms and said shoes on said holder bars providing for automatic self-alignment of said clamping shoes to clamp the pair of baffles and the blank mold together in glass molding position.

References Cited by the Examiner
UNITED STATES PATENTS 2,702,444   2/55   Rowe _____ 65—246 X DONALL H. SYLVESTER, *Primary Examiner.*